United States Patent
Bantz et al.

(10) Patent No.: US 6,711,617 B1
(45) Date of Patent: Mar. 23, 2004

(54) METHOD AND APPARATUS FOR PROVIDING AUTOMATIC CONFIGURATION OF A COMPUTER SYSTEM BASED ON ITS PHYSICAL LOCATION USING AN ELECTRONICALLY READ SCHEDULE

(75) Inventors: David Frederick Bantz, Chappaqua, NY (US); Steven J. Mastrianni, Unionville, CT (US); Ajay Mohindra, Yorktown Heights, NY (US); Dennis G. Shea, Ridgefield, CT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/501,295

(22) Filed: Feb. 9, 2000

(51) Int. Cl.[7] .............................................. G06F 15/16
(52) U.S. Cl. ........................ 709/227; 709/220; 709/217; 370/401
(58) Field of Search ................................. 709/220, 228, 709/227, 217; 370/401

(56) References Cited

U.S. PATENT DOCUMENTS

| | | | | |
|---|---|---|---|---|
| 5,790,974 A | * | 8/1998 | Tognazzini | 701/204 |
| 5,999,882 A | * | 12/1999 | Simpson et al. | 702/3 |
| 6,130,892 A | * | 10/2000 | Short et al. | 370/401 |
| 6,343,317 B1 | * | 1/2002 | Glorikian | 709/218 |
| 6,418,309 B1 | * | 7/2002 | Moon et al. | 455/418 |

OTHER PUBLICATIONS

Ward et al. "A New Location Technique for the Active Office." IEEE Personal Communications. Oct. 1997. pp. 42–47.*

Norton, Peter; Clark, Scott H.A. "Peter Norton's Complete Guide to Norton SystemWorks 2.0." Apr. 1999. acPeter Norton Appendix D.*

Symantech Canada: Mobile Essentials. Published Aug. 1, 1999. http://www.symantec.com/region/can/eng/product/me/.*

Symantech Mobile Essentials 2.5: Product Specifications. 1999. http://www.symantec.com/mobileesstials.*

Intouch: Symantect Article, Edition 10. "Symantec Mobile Essentials 2.0– Don't Let'em Leave Without it." Sep./Oct. 1999.*

* cited by examiner

Primary Examiner—David Wiley
Assistant Examiner—Alina Boutah
(74) Attorney, Agent, or Firm—Thu Ann Dang, Esq.; McGinn & Gibb, PLLC

(57) ABSTRACT

A method, apparatus, and system for automatically configuring a user's portable device, include a module for inferring a current location of the user, and a module for configuring the portable device based on information contained in a configuration of the current location.

3 Claims, 4 Drawing Sheets

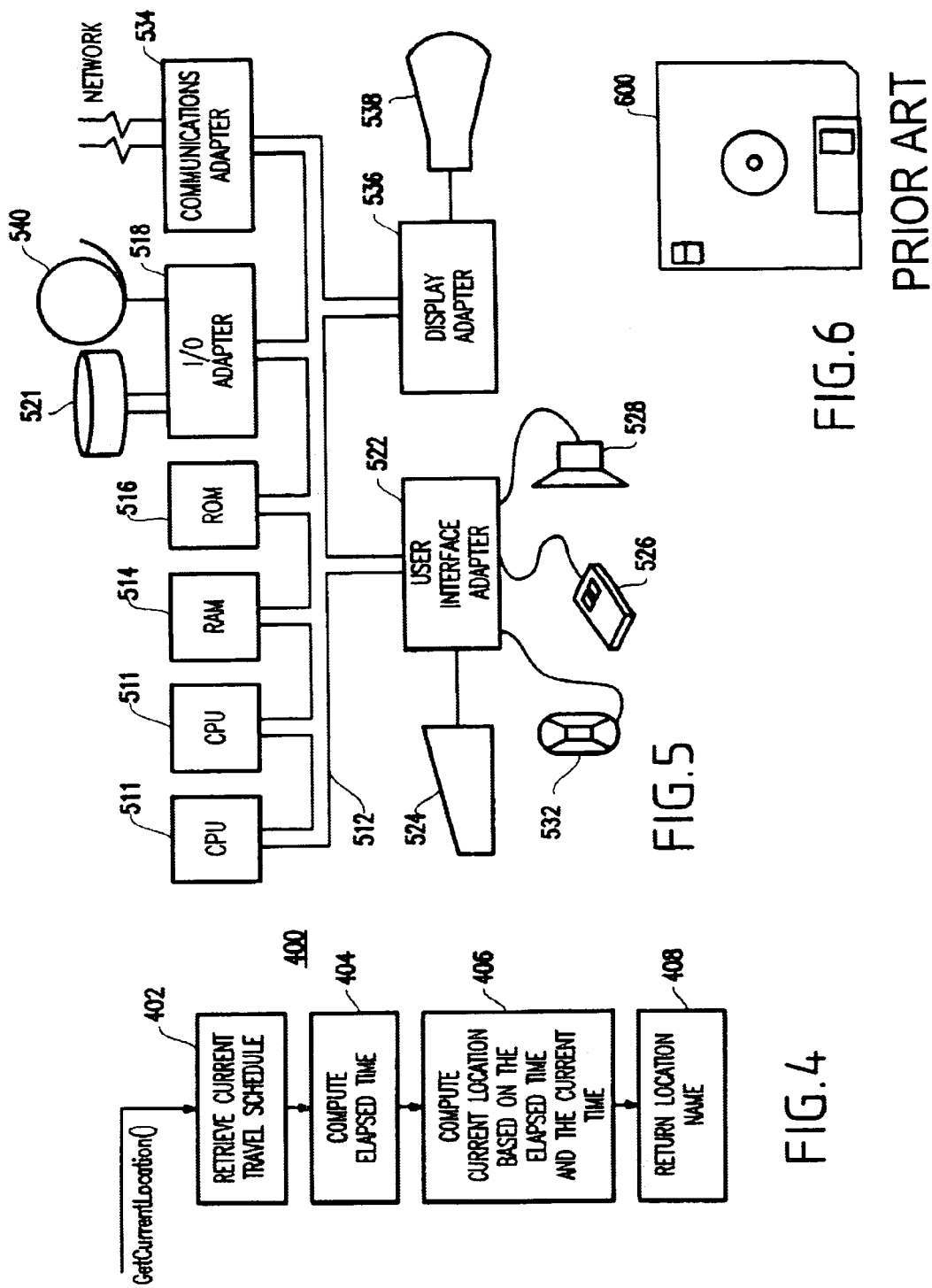

METHOD AND APPARATUS FOR PROVIDING AUTOMATIC CONFIGURATION OF A COMPUTER SYSTEM BASED ON ITS PHYSICAL LOCATION USING AN ELECTRONICALLY READ SCHEDULE

CROSS-REFERENCE TO RELATED APPLICATIONS

The present application is related to U.S. patent application Ser. No. 09/500,923, filed on Feb. 9, 2000, to Mastrianni et al., entitled "METHOD AND APPARATUS FOR A CENTRALIZED FACILITY FOR ADMINISTERING AND PERFORMING CONNECTIVITY AND INFORMATION MANAGEMENT TASKS FOR A MOBILE USER" having IBM Docket No. YO999-518, and to U.S. patent application Ser. No. 09/500,992, filed on Feb. 9, 2000, to Mastrianni et al. entitled "METHOD AND APPARATUS FOR PROVIDING AUTOMATIC CONFIGURATION OF A COMPUTER SYSTEM BASED ON ITS PHYSICAL LOCATION USING ELECTRONIC UNIT" having IBM Docket No. YO999-554, each in their entirely incorporated herein by reference.

BACKGROUND FOR THE INVENTION

1. Field of Invention

The present invention relates to software applications for mobile users, and more particularly to a method and apparatus for providing automatic configuration of a computer system based on its physical location using an electronically read schedule.

2. Description of the Related Art

Due to availability of cheaper, smaller and more powerful computers (e.g., laptops and the like), and easy accessibility to networking infrastructure such as a local area network (LAN) and a telephone connection, an increased number of people are traveling with their computers. The set of options for connecting to the network and the set of resources that are available to a user are largely determined by the physical location where the user is currently located.

For example, if a user is in an office in New York, then the user would connect to the office network using a local area network and would have access to all the services such as scanners and printers located at the office in New York. If for some reason, the users travels with his computer to his branch office in Florida, then the user would have access to resources available at the branch office in Florida. During the trip, if a user stays at a hotel somewhere or travels through an airport, then the user would have access to resources available at the hotel or the airport, respectively.

Typically, at a hotel, the user would use the telephone lines to dial into the office network, and use the printers available at the hotel. After establishing a network connection, a typical user would use variety of software applications to access and manage the information that the user is interested in. For example, to send and receive mail, the user would employ an e-mail client such as Lotus Notes® or Microsoft Outlook®. To transfer files between the user's computer and the office server, the user would either manually copy files or use a file transfer application.

However, a major problem with the current computer system configuration is that the user has to frequently update the computer system configuration parameters whenever the user connects from a different physical location (e.g., hotel, airport, etc.). Such computer system configuration parameters include telephone numbers for connecting to the local service provider, network parameters such as domain name servers, Internet Protocol (IP) address, and printer settings.

This chore is further complicated in that this information must be updated using several software applications, and any inconsistency in updating any of the configuration information can render the computer useless for that physical location. This is a problem.

The problem is further exacerbated for certain class of workers such a sales personnel, insurance agents, etc. who frequently travel. During a typical work week, a sales representative may visit several sites. At each location, a worker must reconfigure the computer configuration settings. This is highly inconvenient for them.

It is noted that some commercial products (e.g., Symantec's Mobile Essentials®) attempt to provide some centralized management and deployment of location profiles. The location profiles include general location information (e.g., country, city and time zone), dialing, network settings for transmission control protocol (TCP)/Internet Protocol (IP) and dial-up, printer configuration and profile setting for other applications such as Web Browsers and E-mail clients.

Another commercial product (e.g., 3Com's DynamicAccess Mobile Connection Manager®) supports creation of multiple standard LAN and remote access configurations. It features single click switching between locations and supports read-only locations for troubleshooting and ease of maintenance.

However, similarly to Symantec's product, this product is deficient in automatically configuring a computer system based on its physical location and certainly does not provide such configuration using an electronically read schedule (e.g., travel, calendar, Appointment, etc.). Indeed, the computer configuration is performed based on the location selected by a user.

Thus, while it may be possible for travelers, etc. to connect to their "home" network (e.g., an Intranet or the like) etc., there is a lot of work, trouble and inconvenience for the users in establishing a network connection. That is, much configuration of the computer must be changed in establishing a successful network connection and gaining access to the user's data, e-mail, other network resources, etc.

SUMMARY OF THE INVENTION

In view of the foregoing and other problems, drawbacks, and disadvantages of the conventional systems and methods, an object of the present invention is to provide a method and system for providing automatic configuration of a portable device (e.g., a computer) based on its physical location.

Another object is to automatically configure a portable device based on an electronically-read schedule (e.g., travel, calendar, appointment, etc.) of a user.

In a first aspect of the present invention, a software facility for automatic configuration of a user's portable device, includes, a module for inferring a current location of the user, and a module for configuring the portable device based on information contained in the configuration of the current location.

In a second aspect, a method for automatically configuring a user's portable device includes inferring a current location of the user, and configuring the portable device based on information contained in the configuration of the current location.

Preferably, the system automatically infers (e.g., determines) where it is located by comparing the current time with the travel times previously read from the user's schedule (e.g., travel, calendar, appointment, etc.) that was previously downloaded or read electronically from a computer system, magnetic card, ticket information, or other type of electronic media including bar code, magnetic stripe, radio frequency identification (RFID) tag, etc. By comparing the elapsed time with the current time, the program can determine where the system is located and automatically configures it for the new location with little or no user intervention.

Thus, the present invention provides means for automatic configuration of the computer based on its physical location. The configuration is done based on intuitive physical location based abstraction for administering and performing connectivity and information management tasks as embodied by the Location Manager described in the above-mentioned U.S. patent application Ser. No. 09/500,923, having IBM Docket NO. YO999-518.

In a preferred embodiment, a software module called a "Travel Module" is provided. The Travel Module keeps track of the electronically read travel schedule and uses an electronic unit/means to determine the physical location of the computer. The gathered information is provided to the Location Manager, which uses the information to select a pre-configured location to configure the computer system.

With the unique and unobvious features of the present invention, the problem of reconfiguration of a computer in a new location is alleviated by automatically configuring the computer system based on its physical location using an electronically read schedule (e.g., travel, calendar, Appointment, etc.).

BRIEF DESCRIPTION OF THE DRAWINGS

The objects, features and advantages of the present invention will be apparent to one skilled in the art, in view of the following detailed description taken in combination with the attached drawings, in which:

FIG. 4 illustrates the flow control diagram for the Travel Module's GetCurrent Location API;

FIG. 5 illustrates an exemplary information handling/computer system 500 for use with the invention on the client (user) side; and FIG. 6 illustrates a medium 600 for storing a program for implementing the method according to the present invention.

DETAILED DESCRIPTION OF THE PREFERRED EMBODIMENT OF THE PRESENT INVENTION

Figure 1:
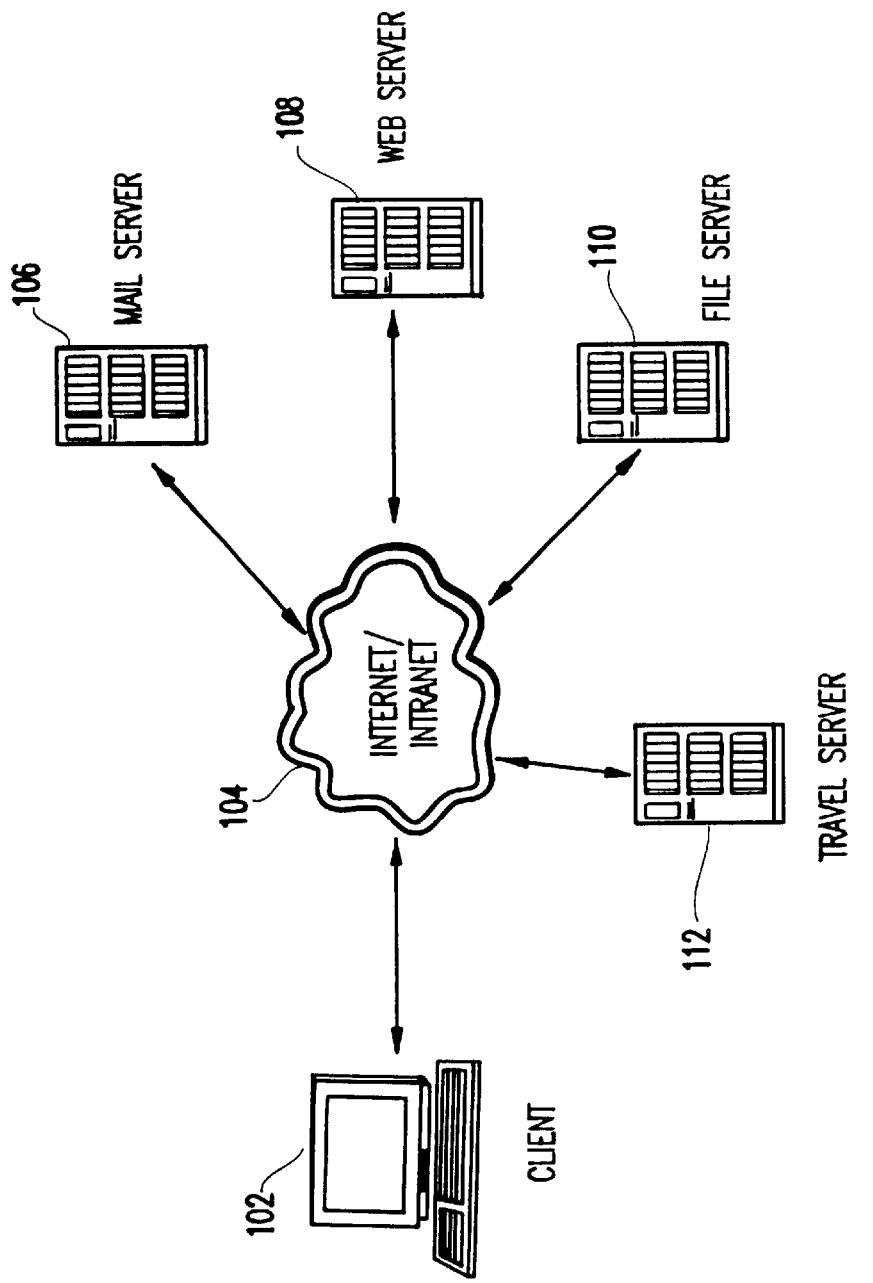
FIG. 1 illustrates a preferred system configuration according to the present invention.

FIG. 1 illustrates a preferred system configuration for the invention. Preferably, the present invention is installed on a portable device such as a client computer 102. The client computer can be advantageously embodied by a laptop personal computer (PC), but of course other portable devices would also find great benefit with the invention, as would be known by one of ordinary skill in the art taking the present application as a whole. FIG. 5 described below illustrates an exemplary form which the client computer may take.

The client 102 computer has an operating system such as Windows 95®, Windows 98®, Windows NT®, or Linux® and appropriate hardware adapters such as a modem, cable modem, DSL modem, token-ring, or Ethernet, to connect to the Internet/Intranet 104.

The client 102 also includes appropriate software drivers installed to enable it to use the TCP/IP communication protocol over the hardware adapters. In addition, the client computer 102 has all the necessary software applications that a users uses to manage its routine information management tasks. These applications include a web browser, a dialer and mail clients. The web browser can be embodied by Netscape Navigator® or Microsoft's Internet Explorer®, a dialer can be embodied by AT&T's Global network dialer; and mail clients can be embodied by Lotus Notes®, Microsoft Outlooks®, or Eudora®.

A user uses the client computer 102 to perform information management tasks with the server connected to the Internet/Intranet 104. These tasks include sending and receiving electronic mail from a mail server 106, retrieving web pages from a web server 108, and sending and receiving data files from a file server. These servers can be embodied, for example, as an IBM RISC® System 6000 computer running the AIX™ operating system, or a PC running Microsoft's Windows NT® Server operating system.

A travel server 112 is also provided for interfacing with the servers 106, 108, 110, as well as client 102, through the Internet/Intranet 104. The travel server 112 maintains and provides client-specific travel information, including travel itinerary, rental car and airline reservations, etc. The travel server can be embodied as an IBM RISC® System 6000 computer running the AIX™ operating system, or a PC running Microsoft's Windows NT® Server operating system. It uses the travel agent's customer database for providing the client-specific travel information.

Figure 2:
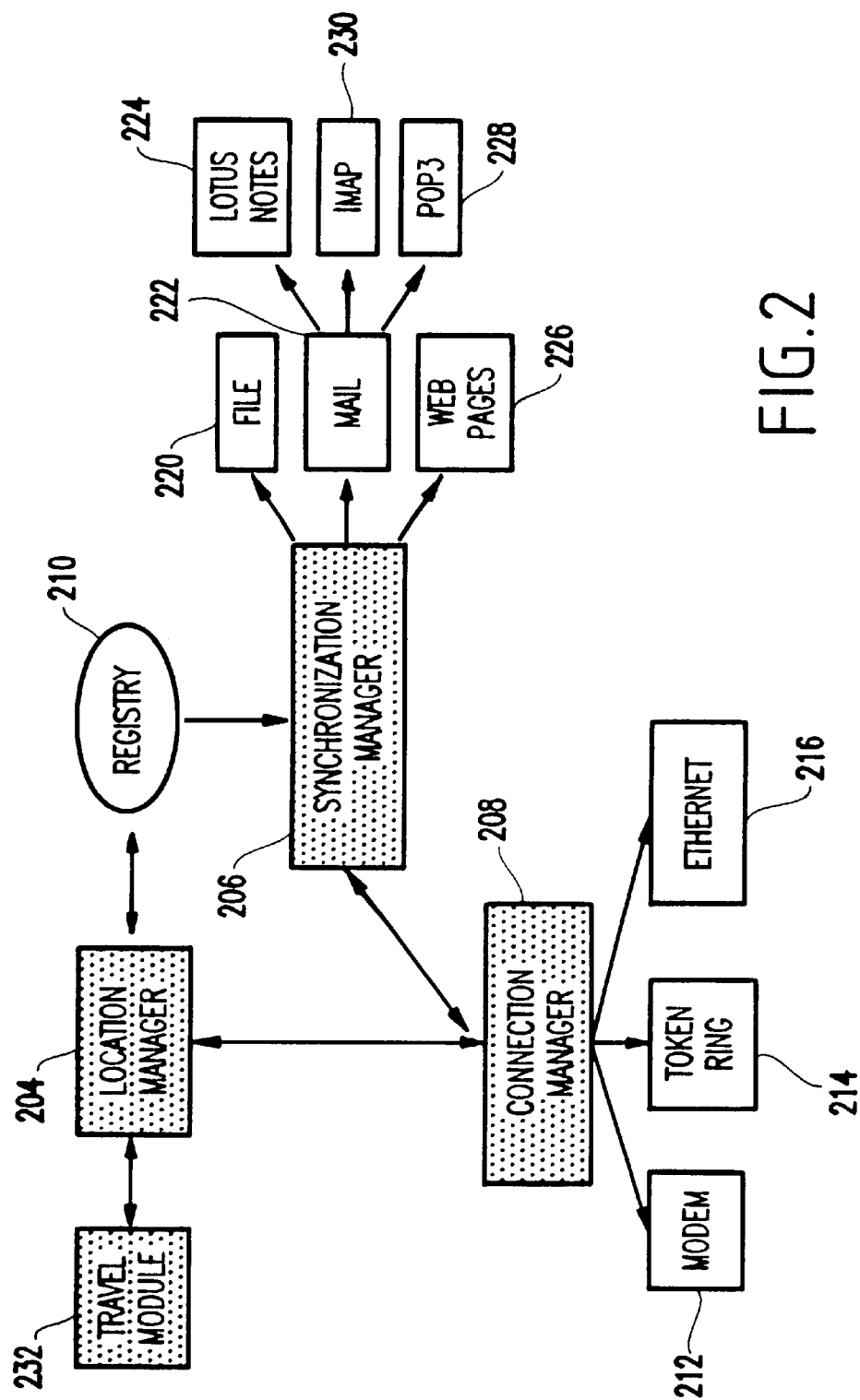
FIG. 2 illustrates a logical software block diagram according to the present invention.

FIG. 2 illustrates a logical software block diagram for the present invention. It includes three modules including a Location Manager 204, a Synchronization Manager 206, a Connection Manager 208, and a Travel Module 232.

The Location Manager 204 provides functionality for administering and managing location-specific information that is stored by the present invention in a Registry 210. The Registry 210 is a database in which the Windows® operating systems maintain the configuration of all the installed programs. The functionality about the Location Manager 204 is described below.

The Synchronization Manager 206 module provides the functionality to send and receive electronic mail 222, synchronize file data 220 and retrieve and hoard (e.g., store) web pages 226 for off-line browsing. The Mail 222 sub-module provides functionality to retrieve mail using the Lotus Notes® 224, Microsoft Exchange®, Internet Message Access Protocol (IMAP®)230 and POP3® 228 protocols.

The Connection Manager 208 provides connectivity functionality to establish a network connection using a modem 212, a token-ring card 214 and an Ethernet card 216. It also provides a graphical user interface (GUI) to enable a user to initiate synchronization.

The Location Manager 204 subsystem is disclosed in Mastrianni et al. U.S. patent application Ser. No. 09/500, 523, having IBM Docket No. YO999-518, filed on Feb. 9, 2000 and assigned to the assignee of the present invention, the teachings of which are incorporated herein by reference.

The Travel Module 232 provides the functionality of determining the physical location of the computer using the user's travel schedule.

The Travel Module 232 exports two APIs called Initialize( ) and GetCurrentLocation( ) to the Location Manager 204.

Figure 3:
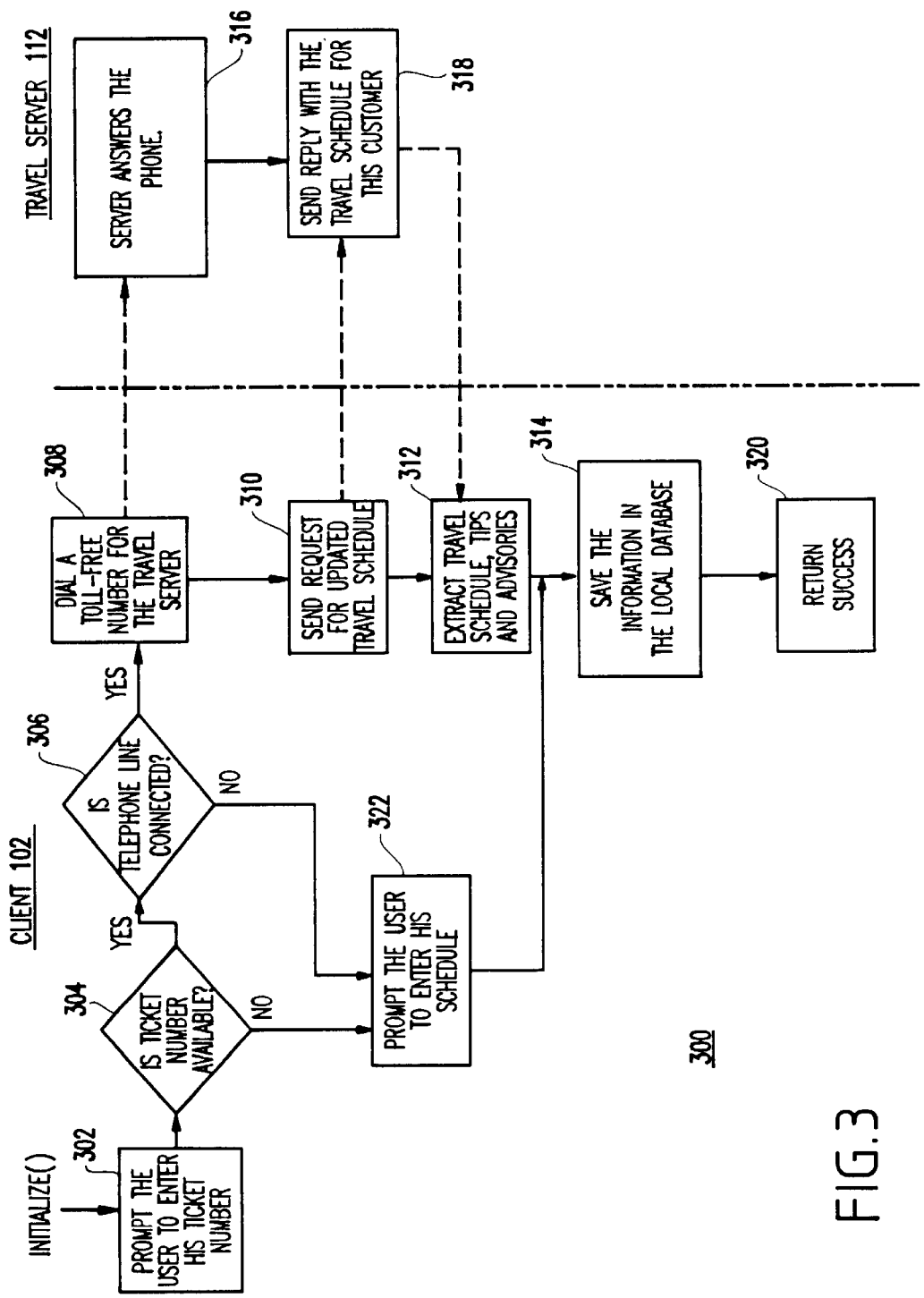
FIG. 3 illustrates a flow control diagram for a Travel Module's Initialize Application Programming Interface (API)

FIG. 3 shows a flow control diagram of the Travel Module 232 for the Initialize( ) call (API).

Before starting travel, a user initializes the Travel Module 232 with the user's travel itinerary. This is performed by instructing the Travel Module 232 to download the travel itinerary from the Travel Server 112 (e.g., through the Internet/Intranet 104). Thus, the user's travel information is downloaded or stored on their system. During initialization, the Location Manager 204 issues the Initialize( ) call 300 (e.g., the steps of which are shown in FIG. 3) to the Travel Module 232.

In step 302 of the inventive method, the Travel Module 232 prompts the user to enter an identification number (e.g., a document number, ticket number etc.) associated with the user's travel. For purposes of the description below, it will be assumed that the ticket number is used. The ticket number is printed on the hard copy of the travel itinerary supplied by the user's travel agent.

In step 304, the Travel module 232 checks if the ticket number is available. For purposes of the invention, "available" means that the Travel module has, in its memory data structure, a record of the ticket number. If the data structure is not initialized to a valid value, then the Travel module assumes that the ticket number is not available.

If a ticket number is available, then in step 306 the Travel Module 232 determines if a telephone line is connected to the modem of the portable device (e.g., computer) 102. This determination is made by the system checking whether a connection has been made with the modem of the portable device (e.g., by querying if a connection is present).

If a line is connected, then in step 308 the Travel module 232 dials a predetermined toll free number to the travel server 112. Upon receiving the call, in step 316 the travel server's modem answers the call.

Simultaneously, in step 310, the client computer 102 sends a request message containing the ticket number to the travel server requesting the itinerary (e.g., updated travel schedule, etc.).

In step 318, the travel server 112 sends a reply to the client with the travel schedule for the user along with any travel tips and advisories relevant to the schedule.

In step 312, the Travel module 232 extracts the travel schedule, along with any tips and advisories, if available.

In step 314, this information is written to an internal database of the client 102 for later use. In step 320, after completing initialization, the Travel Module 232 returns a success message to the Location Manager 204.

If, either in step 304 or in step 306, it is determined that a ticket number is not available or that a telephone line is not connected to the computer 102, the Travel Module 232 proceeds to step 322 where it prompts the user to enter his travel schedule (e.g., manually). After the travel schedule has been entered, the information is saved in the local database (e.g., at the client 102) for later use (e.g., step 314).

FIG. 4 shows the flow control diagram of the Travel Module 232 for the GetCurrentLocation( ) API 400. This API is performed after initialization, as described above with regard to FIG. 3, has been performed.

In step 402, when the user launches the Location Manager 204, the Location Manager 204 queries the Travel Module 232 for the name of the current location where the user is located. The Travel Module 232 retrieves the user's current travel schedule from its internal database.

In step 404, the Travel Module 232 determines the elapsed time since the travel started. This is preferably performed by simply referring to the local clock in the portable device (e.g., computer). No user intervention is required.

In step 406, the module determines the current location of the user based on the elapsed time and the user's travel schedule. If the user is delayed in starting his travel schedule, then the user is prompted by the system, as described below, to confirm the user's current location. It is noted that the invention preferably uses the Universal Time Coordinates (UTC) as a basis for comparing time. Thus, for example, if the starting time was 12:00 P.M. Eastern Standard Time (EST) and the elapsed time is six hours, the module determines where the user is by referring to the travel schedule and determining where the user should be at 6:00 P.M. EST.

Thus, in step 408, the name of the location is then returned to the Location Manager.

After entering the travel schedule, the user shuts down his computer and proceeds with his travel plans. When the user arrives at the new location, the user restarts the computer. Prior to log-in, the Location Manager 204 queries the Travel Module 232 for a valid location name.

If the Location Manager 204 is returned a valid location name by the Travel module 232, the Location Manager 204 uses the information to automatically configure the computer system based on the configuration information stored in the location. The configuration process has been described in the above-mentioned U.S. patent application Ser. No. 09/500,992 concurrently filed herewith and having IBM Docket No. YO999-554.

To ensure that the travel plans have not been adversely affected by airport delays, flight cancellations etc., the Location manager 204 prompts the user with the new location settings before proceeding with reconfiguration.

Thus, in operation, before a user leaves on a trip, their travel information is downloaded or stored on their system. When the user arrives at the location they are traveling to, the system compares the elapsed time with the current time to determine whether the user is located based on the information obtained for the travel schedule. It determines the new location based on this information and automatically configures the system with the parameters and environment for the new location. Using this information, the system also preferably provides travel tips and advisories based on its internal database that is updated periodically on a web site.

The system automatically sets the correct time zone and current settings for the new location, and provides simple travel phrases in the language used at the location that are spoken with the computer's sound system (audio card).

FIG. 5 illustrates a typical hardware configuration (e.g., for the client's portable device) of an information handling/computer system 500 in accordance with the invention. The computer system 500 preferably has at least one processor or central processing unit (CPU) 511.

The CPUs 511 are interconnected via a system bus 512 to a random access memory (RAM) 514, read-only memory (ROM) 516, input/output (I/O) adapter 518 (for connecting peripheral devices such as disk units 521 and tape drives 540 to the bus 512), user interface adapter 522 (for connecting a keyboard 524, mouse 526, speaker 528, microphone 532, and/or other user interface device to the bus 512), a communication adapter 534 for connecting an information handling system to a data processing network, the Internet, an Intranet, etc., and a display adapter 536 for connecting the bus 512 to a display device 538 and/or printer 539.

As shown in FIG. 6, in addition to the hardware and process environment described above, a different aspect of the invention includes a computer-implemented method of providing automatic configuration of computer system based on its physical location using an electronically read travel schedule. As an example, this method may be implemented in the particular hardware environment discussed above.

Such a method may be implemented, for example, by operating the CPU 511 (FIG. 5), to execute a sequence of machine-readable instructions. These instructions may reside in various types of signal-bearing media.

Thus, this aspect of the present invention is directed to a programmed product, comprising signal-bearing media tangibly embodying a program of machine-readable instructions executable by a digital data processor incorporating the CPU 511 and hardware above, to perform a method of automatically configuring a computer system based on its physical location using an electronically read travel schedule.

This signal-bearing media may include, for example, a RAM contained within the CPU 511, as represented by the fast-access storage for example. Alternatively, the instructions may be contained in another signal-bearing media, such as a magnetic data storage diskette 600 (FIG. 6), directly or indirectly accessible by the CPU 511.

Whether contained in the diskette 600, the computer/CPU 511, or elsewhere, the instructions may be stored on a variety of machine-readable data storage media, such as DASD storage (e.g., a conventional "hard drive" or a RAID array), magnetic tape, electronic read-only memory (e.g., ROM, EPROM, or EEPROM), an optical storage device (e.g. CD-ROM, WORM, DVD, digital optical tape, etc.), paper "punch" cards, or other suitable signal-bearing media including transmission media such as digital and analog and communication links and wireless. In an illustrative embodiment of the invention, the machine-readable instructions may comprise software object code, compiled from a language such as "C", etc.

With the unique and unobvious features of the present invention, the problem of reconfiguration of a computer in a new location is alleviated by automatically configuring the computer system based on its physical location using a electronically read travel schedule.

While the invention has been described in terms of preferred embodiments, those skilled in the art will recognize that the invention can be practiced with modification within the spirit and scope of the appended claims.

For example, while the exemplary implementation above has been described with regard to a portable computing device (e.g., a laptop computer), other devices such as personal data assistants (PDAs), Palm Pilots, portable telephones, products such as MobilonPro produced by Sharp Corporation, etc. will find equal benefit with the features of the present invention.

Even though the current invention is embodied using the travel schedule as an example, it can be extended to operate with other types of schedules. For example, the travel itinerary can be replaced with a person's daily calendar. In this case, the Travel module would infer the location of the user from the user's daily calendar based on the user's appointments. This information would be then be used to configure the computer system. The capability of the Travel module to infer the location of a user using different sources of information is a key benefit of the invention.

What is claimed is:

1. A system for automatically configuring a user's portable device, comprising:

a module for inferring a current location of the user; and a module for configuring the portable device based on information contained in a configuration of the current location, wherein said module for inferring a current location comprises a travel location, said travel module providing a functionality of determining the physical location of the portable device using the user's travel schedule, wherein said travel module exports first and second application programming interfaces of Initialize( ) call and GetCurrentILocation( ) call to a location manager, wherein said Initialize( ) call includes:

instructing the travel module to download a travel itinerary of said user from said travel server, to said portable device;

prompting, by the travel module, the user to enter a number of a travel document for the user;

checking whether the travel document number is available; and if said document number is available, then determining by said travel module whether a communication line is connected to the portable device.

2. The system according to claim 1, further comprising:

if said line is connected, then dialing a predetermined number to the travel server;

answering, by said travel server, the call;

simultaneously, sending, by said portable device, a request message containing the document number to the travel server requesting the itinerary;

replying, by said travel server, to the client with the travel schedule for the user;

extracting, by said travel module, the travel schedule;

writing information of said travel schedule to the portable device; and returning, by said travel module, a success message to the location manager.

3. The system according to claim 2, wherein said Initialize( ) call further includes:

if it is determined that a document number is not available or that a communication line is not connected to the portable device, prompting, by the travel module, the user to manually enter the travel schedule of the user.

* * * * *